United States Patent
Johansson

(10) Patent No.: US 9,998,700 B1
(45) Date of Patent: Jun. 12, 2018

(54) IMAGE SENSOR FAILURE DETECTION

(71) Applicant: OmniVision Technologies, Inc., Santa Clara, CA (US)

(72) Inventor: Robert Johansson, Oslo (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 37 days.

(21) Appl. No.: 15/369,504

(22) Filed: Dec. 5, 2016

(51) Int. Cl.
*H04N 5/378* (2011.01)
*H04N 17/00* (2006.01)

(52) U.S. Cl.
CPC .......... *H04N 5/378* (2013.01); *H04N 17/002* (2013.01)

(58) Field of Classification Search
None
See application file for complete search history.

(56) References Cited

U.S. PATENT DOCUMENTS

| | | | |
|---|---|---|---|
| 6,633,335 B1 | 10/2003 | Kwon et al. | |
| 8,698,797 B2 * | 4/2014 | Chen ................. | H04N 13/0011 345/419 |
| 8,736,684 B1 | 5/2014 | Johansson et al. | |
| 8,822,898 B2 | 9/2014 | Yaghmai et al. | |
| 8,854,475 B2 | 10/2014 | Johansson et al. | |
| 2006/0097296 A1 | 5/2006 | Nam | |
| 2006/0192752 A1 | 8/2006 | Ando | |
| 2009/0122174 A1 | 5/2009 | Kano | |
| 2009/0244344 A1 | 10/2009 | Takayanagi et al. | |
| 2009/0256937 A1 | 10/2009 | Noda et al. | |
| 2010/0220224 A1 | 9/2010 | Kadohara | |
| 2011/0292236 A1 * | 12/2011 | Shiohara ................... | G06T 1/00 348/222.1 |
| 2012/0033121 A1 | 2/2012 | Kawata | |
| 2013/0027565 A1 | 1/2013 | Solhusvik et al. | |
| 2013/0083204 A1 | 4/2013 | Solhusvik et al. | |
| 2014/0368714 A1 | 12/2014 | Honda et al. | |

FOREIGN PATENT DOCUMENTS

| | | |
|---|---|---|
| CN | 1264244 A | 8/2000 |
| CN | 1533160 A | 9/2004 |
| CN | 1684503 A | 10/2005 |
| CN | 1691347 A | 11/2005 |

(Continued)

OTHER PUBLICATIONS

U.S. Appl. No. 13/763,498, Office Action dated Dec. 5, 2013.
U.S. Appl. No. 13/763,498, Notice of Allowance dated Mar. 31, 2014.
CN Patent Application Serial No. 201410041409.8, Office Action dated Sep. 5, 2016 (with English translation).
TW Patent Application Serial No. 102134310, Office Action dated Aug. 24, 2015 (with English translation).
TW Patent Application Serial No. 102134310, Notice of Allowance dated Dec. 30, 2015 (with English translation).

(Continued)

*Primary Examiner* — Mark T Monk
(74) *Attorney, Agent, or Firm* — Larry E. Henneman, Jr.; Henneman & Associates, PLC

(57) ABSTRACT

A novel image sensor includes error detection circuitry for detecting sequencing errors. In a particular embodiment a pattern is inserted into a captured image and an image processor detects sequencing errors by determining a location of the pattern. In a more particular embodiment, the image sensor includes a pixel array, arranged in columns and rows. A row select signal is encoded as a bitwise signal, and the bitwise signal is decoded by a multi-input AND gate associated with a particular column of the image sensor, based on a relationship between rows and columns of the pixel array. The relationship determines the pattern asserted into the captured image.

21 Claims, 9 Drawing Sheets

(56) References Cited

FOREIGN PATENT DOCUMENTS

| | | | |
|---|---|---|---|
| CN | 1791185 | A | 6/2006 |
| CN | 1853133 | A | 10/2006 |
| CN | 101115118 | A | 1/2008 |
| CN | 102164251 | A | 8/2011 |
| CN | 102257616 | A | 11/2011 |
| JP | 2000/341592 | A | 12/2000 |
| JP | 2003/101885 | A | 4/2003 |
| JP | 2006/074783 | A | 3/2006 |
| JP | 2010/114550 | A | 5/2010 |
| JP | 2010/225927 | A | 10/2010 |
| TW | I254793 | B | 5/2006 |
| TW | 2011/06691 | A | 2/2011 |

OTHER PUBLICATIONS

U.S. Appl. No. 13/763,562, Office Action dated Dec. 6, 2013.
U.S. Appl. No. 13/763,562, Notice of Allowance dated Jul. 8, 2014.
CN Patent Application Serial No. 201410041441.6, Office Action dated Jun. 11, 2015 (with English translation).
CN Patent Application Serial No. 201410041441.6, Notice of Allowance dated Feb. 4, 2016 (with English translation).
TW Patent Application Serial No. 102134308, Office Action dated Dec. 24, 2014 (with English translation).
TW Patent Application Serial No. 102134308, Notice of Allowance dated Sep. 10, 2015 (with English translation).

\* cited by examiner

IMAGE SENSOR FAILURE DETECTION

BACKGROUND OF THE INVENTION

Field of the Invention

This invention relates generally to image sensors, and more particularly to the detection of readout failures in image sensors. Even more particularly, this invention relates to the detection of readout timing problems in image sensors.

Description of the Background Art

Electronic image sensors are commonly incorporated into a variety of devices including, for example, cell phones, computers, digital cameras, PDA's, etc. In addition to conventional user-controlled still and video camera applications, more and more image sensor applications are emerging. For example, integral machine vision applications are expanding rapidly in the automotive, manufacturing, medical, security, and defense industries. In such applications, machines typically perform certain important operational tasks (e.g. collision prevention tasks) based on information (e.g. position of an object relative another object) captured by the image capture system of the machine. In order for the machine to perform the proper task associated with the particular situation, it is essential for the image sensor to reliably capture, process, and output image data that accurately represents the observed situation.

Typically image sensors include a plurality of photosensitive pixels in an array of rows and columns. Each pixel in a row of photosensitive pixels is coupled to a row select line, and each pixel in a column of photosensitive pixels is coupled to a readout line. When a row of photosensitive pixels is selected, e.g., by asserting a select signal on the associated row select line, each pixel in the row is electrically coupled to an associated readout line, which can then read out a pixel value from the pixel. The pixel values depend on an intensity of light that has impinged on the pixel during a predetermined time period. This process repeats until every row of pixel values has been read out of the array, and the stored pixel values are image data representative of the image impinging on the array of pixel values.

Sometimes readout errors occur in image sensors. For example, the pixel value read from a given pixel may not correctly correspond to the intensity of light that has impinged on the pixel during the predetermined time period. As another example, an error can occur when the row select signals are asserted on the row enable lines in an incorrect order, which results in the rows of pixel data being in the wrong location within the image data. These and other errors can negatively affect the quality of the captured images and the functionality of the host machine that is utilizing the image sensor. For example, a host machine that uses an image sensor to monitor whether an automobile remains within a road lane may malfunction if the image sensor does not reliably obtain image data representative of the position of the automobile with respect to the lane. Host machines with critical functionality demand image sensors with exceptionally high reliability.

What is needed, therefore, is an image sensor design with improved image data output reliability.

SUMMARY

The present invention overcomes the problems associated with the prior art by providing an image capture device that includes a means for verifying the proper sequencing of rows photosensitive pixels during the image capture process. The invention facilitates a greater degree of confidence in images captured by the device, and makes the device more suitable for critical applications.

An example image capture device is configured to detect sequencing errors. The example image capture device includes an array of photosensitive pixels, a sampling circuit, a pattern generator, and an image processor. The array of photosensitive pixels is operative to capture pixel values corresponding to an image (e.g., light intensity values) incident thereon. The sampling circuit is operative to receive the pixel values from the array of photosensitive pixels and to store the pixel values as image data. The pattern generator is operative to overwrite a group of the pixel values with a predetermined value, while the pixel values are being received from the photosensitive pixels by the sampling circuit, to introduce a predetermined pattern into the image data. The image processor is electrically coupled to receive the image data and configured to analyze the image data to determine a location of the predetermined pattern within the image data. The image processor then determines whether a sequencing of rows of pixels of the display was correct while the image data was captured based on the location of the predetermined pattern.

In a particular example image capture device, the sampling circuit is operative to read a row of pixel values from each of the rows of pixels during an associated predetermined time period and to convert the rows of pixel values into rows of the image data corresponding to each of the rows of pixels. The pattern generator is operative to overwrite one of the pixel values in each of the rows of pixel values with a predetermined value during the predetermined time period. Additionally, the image processor is configured to determine whether the sequencing of the rows of pixels of the display was correct based at least in part on a position of the predetermined values in each of the rows of image data.

The example image capture device additionally includes an encoder coupled to receive signals indicative of a selected row of the pixel array. The encoder is operative to provide an encoded value to the pattern generator indicative of the selected row. The pattern generator decodes the encoded value, determines a particular pixel location within the selected row depending on the encoded value, and overwrites the pixel value corresponding to the determined location with the predetermined pixel value. The image capture device also includes a plurality of row select lines. Each of the row select lines is electrically coupled to communicate a row select signal to each of the photosensitive pixels in an associated one of the rows of photosensitive pixels. The encoder is coupled to the plurality of row select lines and configured to generate the encoded values based at least in part on which of the row select lines is communicating the row select signal. The sampling circuit includes a plurality of readout lines. Each readout line of the plurality of readout lines is coupled to each photosensitive pixel in an associated column of pixels, and is configured to transfer the pixel values from the photosensitive pixels in the column to the sampling circuit. The pattern generator is coupled to the plurality of readout lines and is configured to decode the encoded values and assert a predetermined voltage corresponding to the predetermined value on one of the readout lines based on each encoded value. In disclosed embodiments, the pixel values have a range, and the predetermined value is outside of the range of the pixel values.

In a particular example image capture device, the photosensitive pixels of the array are arranged in columns and rows. Which pixel values of each particular row that are overwritten depends on a location of each particular row in the array. Optionally, for each row (r), a pixel value in column (c=r) is overwritten with the predetermined value, where (r) is a variable representing row position and (c) is a variable representing column position in the array. In this example, the predetermined pattern is a diagonal line in an image represented by the image data. Optionally, the image processor is further operative to remove the predetermined pattern from the image data after determining the location of the predetermined pattern within the image data.

An example method for detecting sequencing errors in an image capture device is also disclosed. The example method includes capturing pixel values corresponding to an image with an array of photosensitive pixels and storing the pixel values as image data. The example method additionally includes overwriting a group of the pixel values with a predetermined value during the step of capturing the pixel values to introduce a predetermined pattern into the image data. The example method also includes analyzing the image to determine a location of the predetermined pattern within the image data, and determining whether a sequencing of rows of pixels of the display was correct during the step of capturing the pixel values, based on the location of the predetermined pattern.

In a particular example method, the step of capturing pixel values corresponding to an image with an array of photosensitive pixels includes reading a row of pixel values from each of the rows of pixels during an associated predetermined time period. The step of storing the pixel values as image data includes converting the rows of pixel values into rows of the image data corresponding to each of the rows of pixels. The step of overwriting a group of the pixel values with a predetermined value includes overwriting one of the pixel values in each of the rows of pixel values with a predetermined value during the predetermined time period. The step of determining whether a sequencing of rows of pixels of the display was correct during the step of capturing the pixel values includes determining whether the sequencing of the rows of pixels of the display was correct based at least in part on a position of one of the predetermined values in each of the rows of image data.

In a more particular example method, the step of overwriting one of the pixel values in each of the rows of pixel values with a predetermined value during the predetermined time period includes detecting a signal indicative of a selected row of the pixel array, and providing an encoded value indicative of the selected row. The step of overwriting additionally includes decoding the encoded value to determine a particular pixel location within the selected row depending on the encoded value, and overwriting the pixel value corresponding to the determined pixel location with the predetermined value. The step of reading a row of pixel values from each of the rows of photosensitive pixels includes electrically coupling a row select line to each of the rows of pixels and communicating a row select signal to each of the photosensitive pixels in an associated one of the rows of photosensitive pixels. The step of providing an encoded value indicative of the selected row includes generating the encoded value based at least in part on which of the row select lines is communicating the row select signal.

In an even more particular example method, overwriting one of the pixel values in each of the rows of pixel values with a predetermined value during the predetermined time period includes electrically coupling a plurality of readout lines to the photosensitive pixels, each readout line of the plurality of readout lines being coupled to each photosensitive pixel in an associated column of pixels. Overwriting one of the pixel values additionally includes transferring the pixel values from the photosensitive pixels of each column via the associated readout lines, and asserting a predetermined voltage corresponding to the predetermined value on a different one of the readout lines based on each the encoded value. The step of capturing pixel values corresponding to an image with an array of photosensitive pixels includes capturing pixel values within a range, and the step of overwriting a group of the pixel values with a predetermined value during the step of capturing the pixel values includes overwriting a group of the pixel values with a value that is outside of the range of the pixel values.

In an example method, the photosensitive pixels of the array are arranged in columns and rows. Which pixel values of each particular row that are overwritten depends on a location of each particular row in the array. For example, overwriting a group of the pixel values with a predetermined value during the step of capturing the pixel values includes, for each row (r), overwriting a pixel value in column (c=r) with the predetermined pixel value, where (r) is a variable representing row position and (c) is a variable representing column position in the array. As a result, the step of overwriting a group of the pixel values with a predetermined value during the step of capturing the pixel values to introduce a predetermined pattern into the image data includes overwriting a group of the pixel values to create a diagonal line in an image represented by the image data.

Optionally, the example methods additionally include removing the predetermined pattern from the image data after determining the location of the predetermined pattern within the image data.

An example method of manufacturing an image capture device capable of detecting sequencing errors is also disclosed. The example method includes forming an array of photosensitive pixels in a substrate. The array of photosensitive pixels is operative to capture pixel values corresponding to an image incident thereon. The method additionally includes forming a sampling circuit in the substrate. The sampling circuit is operative to receive the pixel values from the array of photosensitive pixels and to store the pixel values as image data. The example method additionally includes forming a pattern generator in the substrate. The pattern generator is operative to overwrite a group of the pixel values with a predetermined value, while the pixel values are being received from the photosensitive pixels by the sampling circuit, to introduce a predetermined pattern into the image data. The example method additionally includes providing an image processor electrically coupled to receive the image data. The image processor is configured to analyze the image data to determine a location of the predetermined pattern within the image data and to determine whether a sequencing of rows of pixels of the display was correct while the image data was captured based on the location of the predetermined pattern.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an image sensor with increased image readout reliability, particularly with respect to sequencing of rows of pixels during readout. In the following description, numerous specific details are set forth (e.g., encoding/decoding methods) in order to provide a thorough understanding of the invention. Those skilled in the art will recognize, however, that the invention may be practiced apart from these specific details. In other instances, details of well-known image sensor practices (e.g., mounting, alignment, calibration, etc.) and components (e.g., pixel structure) have been omitted, so as not to unnecessarily obscure the present invention.

Figure 1:
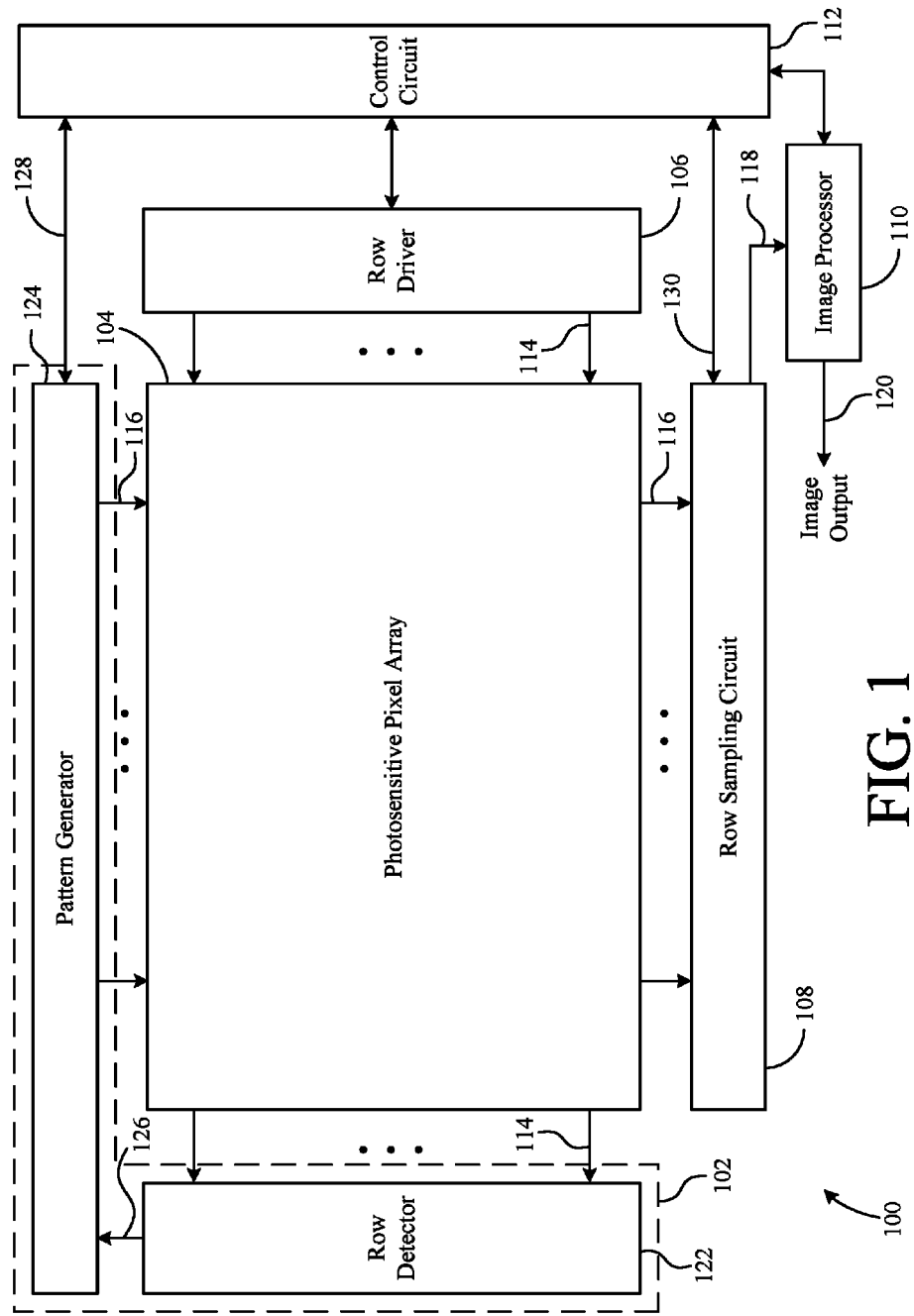
FIG. 1 is a block diagram showing an example image capture device and associated failure detection circuitry.

FIG. 1 shows an example image sensor 100, including additional error detection circuitry 102. Image sensor 100 also includes a photosensitive pixel array 104, a row driver 106, a row sampling circuit 108, an image processor 110, and a control circuit 112. Pixel array 104 is an array of photosensitive pixels 200 arranged in rows 202 and columns 204 (FIG. 2) and operative to capture an image focused thereon by optics (not shown). Pixel array 104 is electrically coupled to row driver 106 by a plurality of row control lines 114 and to row sampling circuit 108 by a plurality of readout lines 116. Row control lines 114 are each coupled to a row 202 of photosensitive pixels 200 and readout lines 116 are each switchably coupled to a column 204 of photosensitive pixels 200. Row driver 106 asserts control signals on row control lines 114, which cause pixels of selected rows 202 to assert pixel values onto readout lines 116, which are captured and stored as image data by row sampling circuit 108, one row at a time. Row sampling circuit 108 transfers the image to image processor 110, via a data line 118. Image processor 110 analyzes the captured image to determine whether any errors occurred during the capture of the image and outputs the image to a host device (not shown), via a data line 120.

Control circuit 112 is interconnected to provide control signals to the various elements of image sensor 100 to control and coordinate the operation of image sensor 100. For example, control circuit 112 provides sequencing signals to row driver 106 and row sampling circuit 108 to ensure that the image data is properly readout from pixel array 104. The functionality of image processor 110 and control circuit 112 will be discussed in more detail below, in conjunction with error detection circuitry 102.

Error detection circuitry 102 alters the image readout from pixel array 104, in order to provide a reference for image processor 110 to utilize when analyzing the captured image for errors (e.g., timing errors). Error detection circuitry 102 includes a row detector 122 and a pattern generator 124. Row detector 122 is electrically coupled to row driver 106, opposite pixel array 104, via row control lines 114. When a control signal, associated with one of rows 202, is asserted on one of row control lines 114 by row driver 106, row detector 122 detects the asserted signal and generates an output indicative of that one of rows 202. Row detector 122 provides the generated output to pattern generator 124, via a data line 126.

Based on the output indicative of the particular one of rows 202 received from row detector 122, pattern generator 124 asserts a predetermined value on a corresponding one of readout lines 116. The predetermined value is read by row sampling circuit 108 as a data value in an associated row of image data read from pixel array 104. The predetermined values in the rows of image data have values outside the normal range of pixel values from pixel array 104 and, therefore, form a detectable pattern on the captured image.

Image processor 110 analyzes the pattern and determines whether rows of image data have been read from pixel array 104 in a proper order. The pattern can be relatively simple, for example a diagonal line across at least a portion of the captured image, a seemingly random assortment of lines, or a seemingly random assortment of pixels. The particular pattern is not critical, as long as image processor 110 can utilize the pattern to determine whether readout errors have occurred when capturing an image, but the simple diagonal line provides advantages including less complex generation and detection. Optionally, image processor 110 can remove the pattern from the captured image. For example, in a disclosed embodiment, image processor 110 interpolates between neighboring pixels and replaces the pattern values with the interpolated values, before outputting the image to the host device.

Control circuit 112 provides control and sequencing signals to pattern generator 124 and image processor 110 to coordinate the pattern insertion into the captured image and the analysis of the patterned image, respectively. For example, control circuit 112 provides an enable signal, via an enable line 128, to pattern generator 124 and a sampling signal, via a sampling line 130, to row sampling circuit 108 to synchronize the patterning and capturing of the image from pixel array 104.

Figure 2:
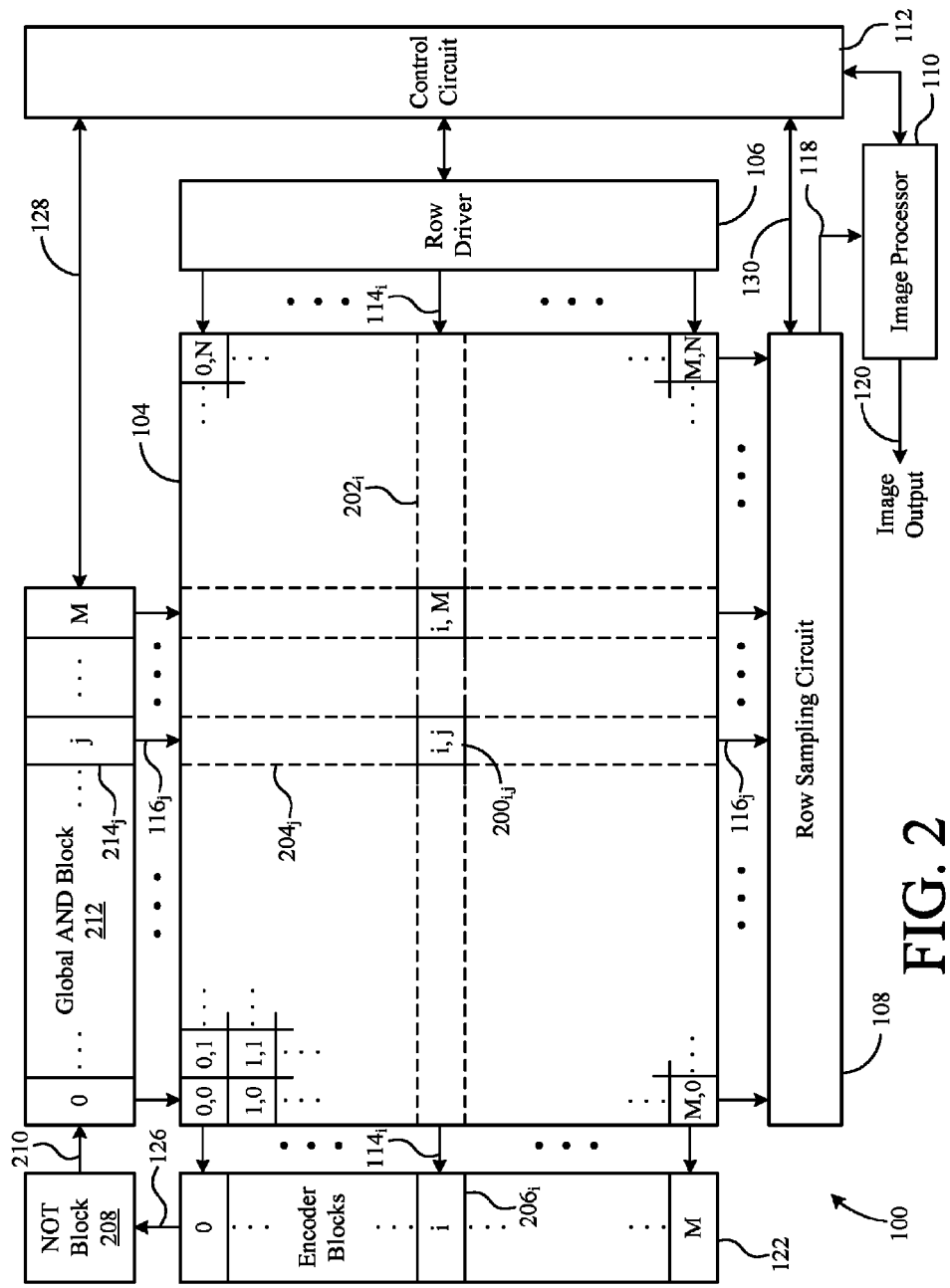
FIG. 2 is a block diagram showing the image capture device and associated failure detection circuitry of FIG. 1 in more detail.

FIG. 2 shows image sensor 100, with pixel array 104, row detector 122, and pattern generator 124 shown in greater detail. Pixel array 104 includes a plurality of photosensitive pixels 200 arranged in rows 202 and columns 204. Pixel array 104 includes M+1 rows 200, wherein the first row is denoted $200_0$ and the last row is denoted $200_M$. Similarly, pixel array 104 includes N+1 columns 204, wherein the first column is denoted $204_0$ and the last column is denoted $204_N$. Each of pixels 200 has a unique address i,j wherein i denotes the row of the pixel and j denotes the column of the pixel. Thus, pixel $200_{i,j}$ is located in the $i^{th}$ column and the $j^{th}$ row. Each row $202_i$ is coupled to an associated set of row control lines $114_i$. Each column $204_j$ is coupled to an associated readout line $116_j$. When a row select signal is asserted on one of row control lines $114_i$ by row driver 106, each of pixels 200 in row $202_i$ is then electrically coupled to an associated one of readout lines 116. Row sampling circuit 108 then reads a data value from each of pixels 200 in row $202_i$ to form a row of image data. This process is repeated for rows $202_0$-$202_M$ to form a captured image comprising M+1 rows of image data.

Row detector 122 includes a plurality of encoder blocks 206, each electrically coupled to row control lines 114, wherein encoder block $206_i$ is electrically coupled to at least one of row control lines $114_i$. When row driver 106 asserts a row select signal on row control lines $114_i$, Encoder block $206_i$ encodes the row select signal into an encoded bitwise value and provides the encoded value, via a data line 126, to a NOT block 208, which, together with a global AND block 210, comprises pattern generator 102. NOT block 208 inverts the bitwise value to form an inverted value and provides the inverted value, via a data line 210, to global AND block 212. Global AND block 212 includes a plurality of AND gates 214, each coupled to one of readout lines 116, wherein each AND gate $214_j$ is electrically coupled to an associated readout line $116_j$. Each AND gate $214_j$ switchable couples a high voltage source $610_j$ (FIG. 6) to an associated readout line $116_j$. When the inverted value received from NOT block 208 corresponds to AND gate $214_j$, high voltage source $610_j$ is electrically coupled to readout line $116_j$ and the data value corresponding to pixel $200_{i,j}$ in the captured image is replaced with a predetermined value based on high voltage source $610_j$. In the example embodiment, the relationship between row $202_i$ and column $204_j$ for pixel $200_{i,j}$ is such that i=j, which results in a diagonal line being patterned on the image captured from pixel array 104. However, in alternate embodiments, the relationship can be any function that includes row numbers as the domain and column numbers as the range. The structure and function of row detector 122, NOT block 208, and global AND block 212 will be discussed in more detail with reference to FIGS. 4-6 below.

Figure 3:
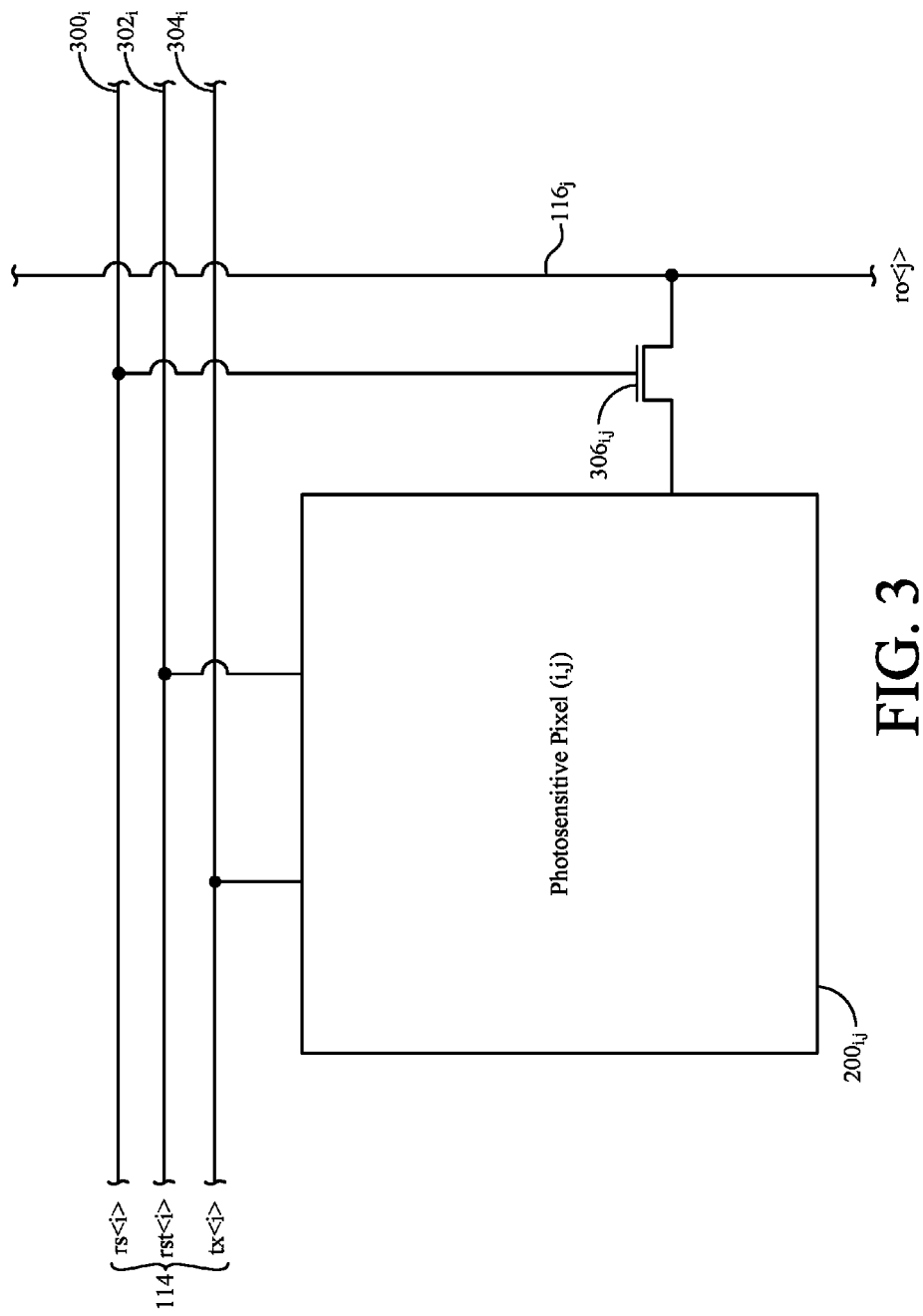
FIG. 3 is a block diagram showing an example one of the photosensitive pixels of FIG. 2 and associated control lines in more detail.

FIG. 3 is a block diagram showing pixel $200_{i,j}$, an associated set of row control lines $114_i$ and an associated readout line $116_j$. In the example embodiment, pixel $200_{i,j}$ is a typical four-transistor (4T) pixel with a pinned photodiode (not shown). Pixel $200_{i,j}$ is coupled to a row select line $300_i$, a reset line $302_i$, and a transfer line $304_i$, which together comprise row control lines $114_i$. When a reset signal is asserted on reset line $302_i$, pixel $200_{i,j}$ is returned to an initial charge state. Then light impinging on the photodiode of pixel $200_{i,j}$ creates an accumulation of charge, wherein the amount of accumulated charge is proportional to the intensity of the impinging light. Next, when a transfer signal is asserted on transfer line $304_i$, the accumulated charge is transferred from the photodiode to a floating diffusion region (not shown). Row select line $300_i$ is electrically coupled to a gate transistor $306_{i,j}$, which is connected between the floating diffusion region of pixel $200_{i,j}$ and readout line $116_j$. When a row select signal is asserted on row select line $300_i$, gate transistor $306_{i,j}$ enters a conductive state, and a voltage indicative of the charge accumulated in the floating diffusion region is transferred to readout line $116_j$. This voltage is read by row sampling circuit 108 as the $j^{th}$ pixel value in the $i^{th}$ row of image data.

Figure 4:
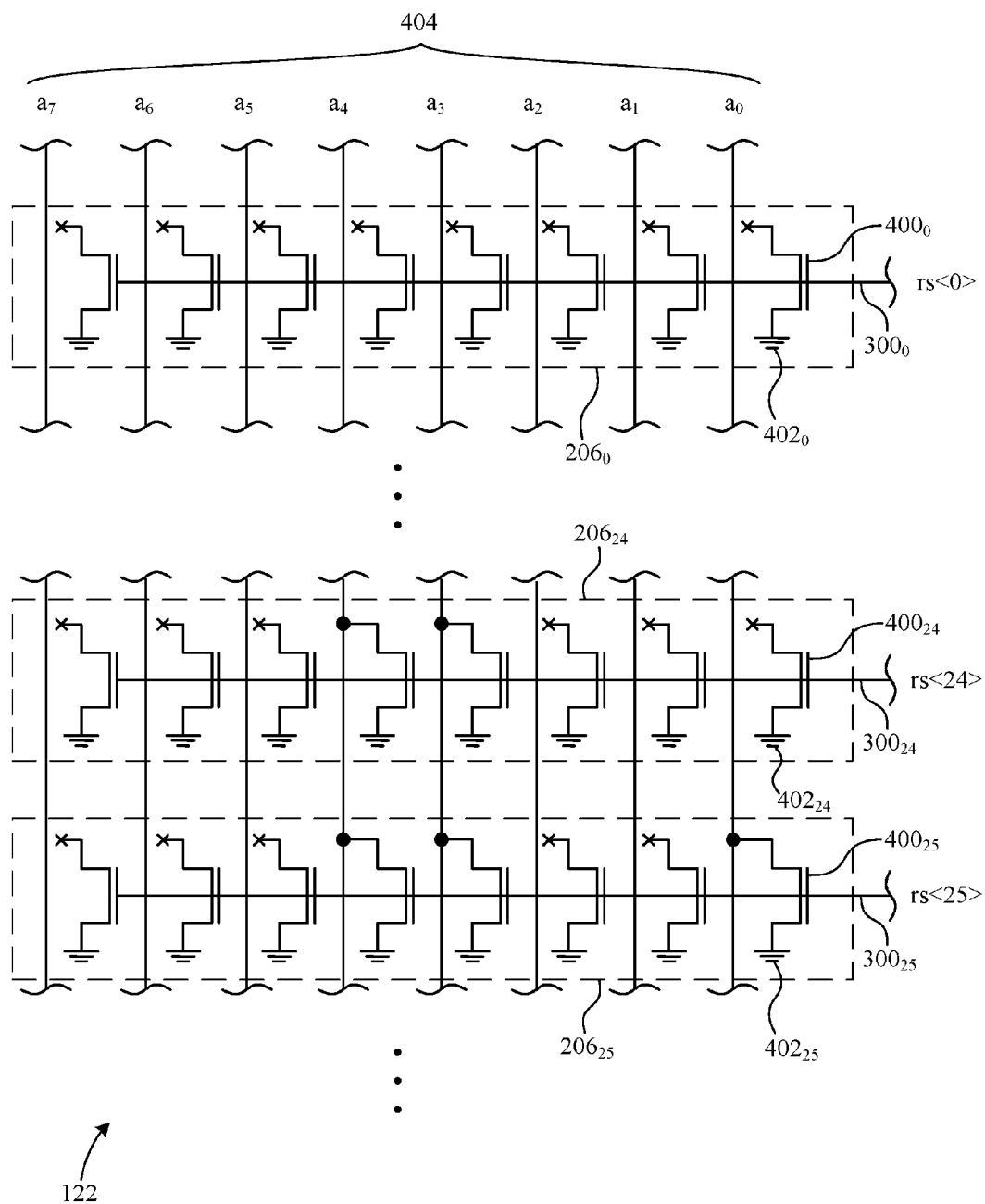
FIG. 4 is a schematic diagram showing the global OR block of FIG. 2 in more detail.

FIG. 4 shows a portion of row detector 122, including encoder blocks $206_0$, $206_{24}$, and $206_{25}$. Encoder block $206_0$ includes a plurality of gate transistors $400_0$ (in the example, encoder block $206_0$ includes eight of gate transistors $400_0$) all coupled to row select line $300_0$. Each of gate transistors $400_0$ is coupled to a ground $402_0$. None of transistors $400_0$ are coupled to a plurality of encoding lines $404(a_{0-7})$. Encoding lines $404(a_{0-7})$ are each coupled to one of a plurality of voltage sources 500 (FIG. 5), which hold encoding lines 404 at a reference voltage (e.g., $V_{dd}$ or digital one). When a row select signal is asserted on row select line $300_0$, transistors $400_0$ are placed in a conductive state, but none of encoding lines 404 are pulled to ground (digital zero), because they are not coupled to any of transistors $400_0$ and, therefore, are not coupled to any of grounds $402_0$. A bitwise signal is, thus, asserted on encoding lines 404. The bitwise signal for row $202_0$ is 11111111, which is the inverse of 00000000, or binary 0. Generally, row detector 122 produces a signal that is indicative of the particular one of row select lines 300 that has a row select signal asserted thereon. In other words, row detector 122 functions as the inverse of a row decoder, receiving a row select signal on one of its input terminals and producing a row address signal corresponding to the input terminal as an output.

Encoder block $206_0$ is provided for completeness of explanation and illustration. However, it should be clear that, in this example, because none of gate transistors $400_0$ are coupled to any of encoding lines 404, gate transistors $400_0$ would not be included in an actual device.

Encoder block $206_{24}$ is substantially similar to encoder block $206_0$, the only difference being that a subset of transistors $400_{24}$ are coupled to encoding lines 404. In particular, one of transistors $400_{24}$ is coupled to line $a_4$ and another of transistors $400_{24}$ is coupled to line a. When a row select signal is asserted on row select line $300_{24}$, a bitwise signal 11100111 (the inverse of 0011000, or binary 24) is asserted on encoding lines 404.

Similarly, encoder block $206_{25}$ includes a subset of transistors $400_{25}$ that are coupled to encoding lines 404. In particular, one of transistors $400_{25}$ is coupled to line $a_4$, another one of transistors $400_{25}$ is coupled to line $a_3$, and yet one of transistors $400_{25}$ is coupled to line $a_0$. When a row select signal is asserted on row select line $300_{25}$, a bitwise signal 11100110 (inverse of 00011001, or binary 25) is asserted on encoding lines 404. In general, encoder block $206_i$ includes a subset of transistors $400_i$ that are coupled to encoding lines 404. When a row select signal is asserted on row select line $300_i$, a bitwise signal corresponding to row $200_i$ is formed on encoding lines 404. The bitwise signal will be the inverse of the binary row address associated with the particular row $200_i$.

Figure 5:
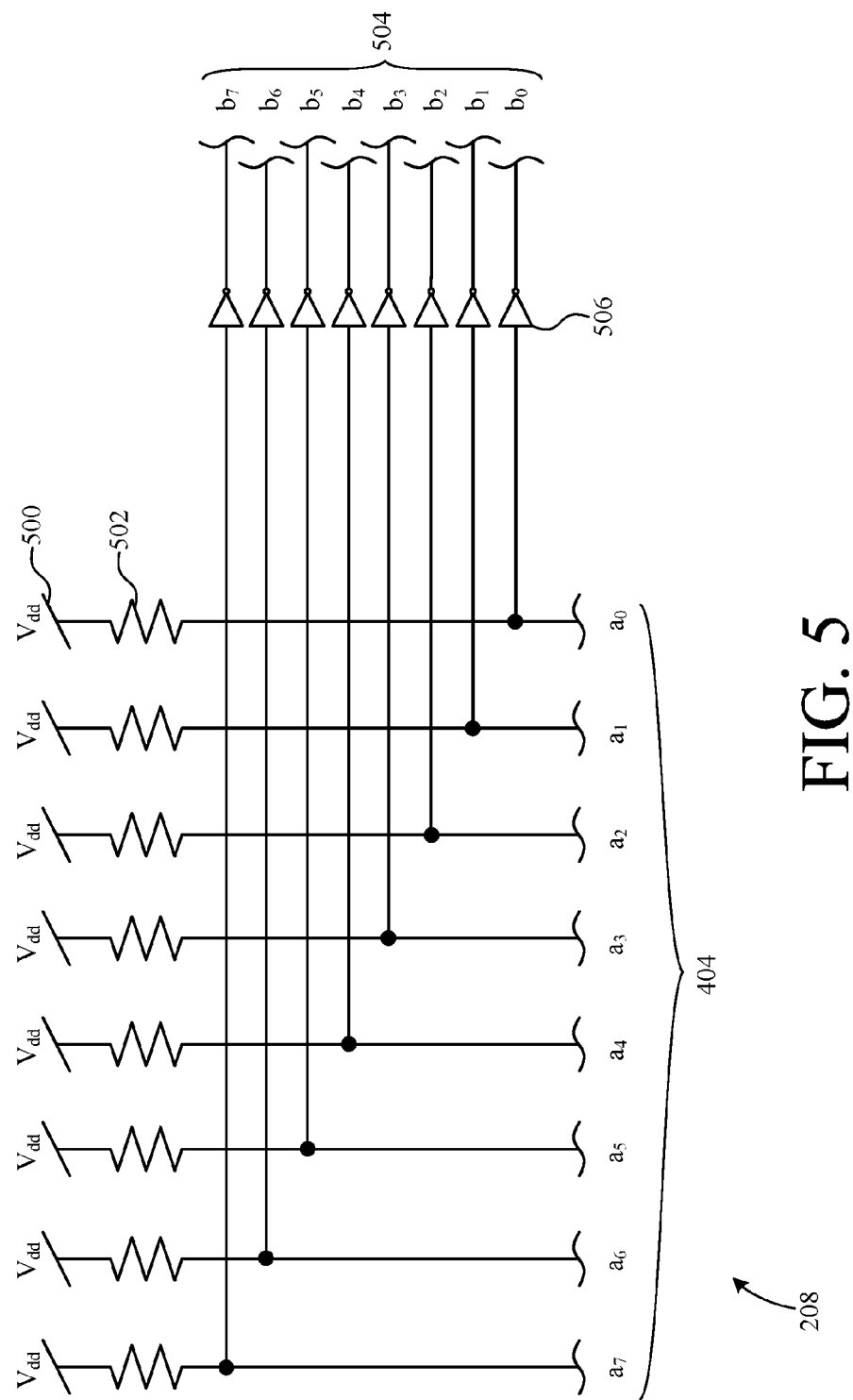
FIG. 5 is a schematic diagram showing the NOT block of FIG. 2 in more detail.

FIG. 5 shows NOT block 208 in greater detail. NOT block 208 inverts the bitwise signals received from row detector 122 to generate the binary address corresponding to the currently enabled row. Each of encoding lines 404 is coupled to voltage source 500. Voltage source 500 holds each of encoding lines 404 at a high reference voltage ($V_{dd}$), which corresponds to a digital one, unless the one or more of encoding lines $404a_{4-7}$ are pulled low by an encoding block $206_i$ of row detector 122, as explained above with reference to FIG. 4. A plurality of resistors 502 are coupled between encoding lines 404 and voltage sources 500 to limit electric current when one or more of encoding lines 404 are pulled low by row detector 122.

Each of encoding lines $404(a_{0-7})$ is coupled to a corresponding one of decoding lines $504(b_{0-7})$. Specifically, lines $a_0$, $a_1$, $a_2$, etc. are coupled to lines $b_0$, $b_1$, $b_2$, etc., respectively. One of a plurality of inverters 506, is coupled between each encoding line 404 and each decoding line 504. Inverters 506 receive the encoded row values on encoding lines 404, invert those values to generate a row address associated with the currently enabled row, and provide the row address on decoding lines 504. For example, inverters 506 receive the encoded value corresponding to row 24 (11100111, from above) and output the address 00011000 (binary 24) onto decoding lines $504(b_{0-7})$.

Those skilled in the art will recognize that this particular element (as well as other described elements, even if not explicitly stated) is not an essential element of the present invention. For example, in particular embodiments of the invention, this element may be omitted by adapting global AND block 212 to decode an un-inverted signal. As another example, NOT block 212 could be functionally combined with row detector 122 or global AND 212.

Figure 6:
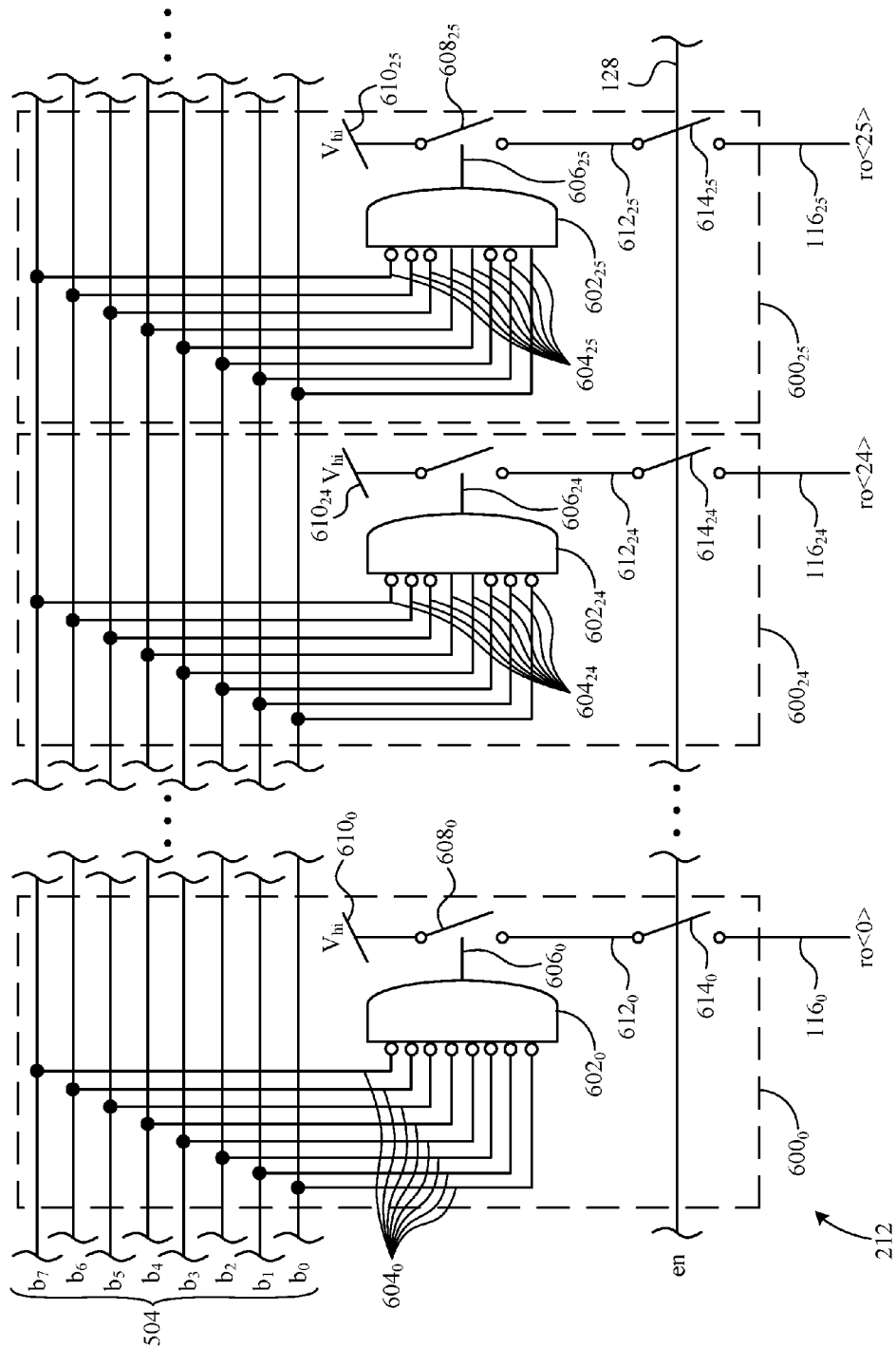
FIG. 6 is a schematic diagram showing the global AND block of FIG. 2 in more detail.

FIG. 6 shows a representative portion of global AND block 212, including local AND blocks $600_0$, $600_{24}$, and $600_{25}$. Global AND block 212 includes local AND blocks $600_{0-N}$, but only local AND blocks $600_0$, $600_{24}$, and $600_{25}$ are shown. Each local AND block 600 includes a multi-input AND gate 602 having a plurality of input terminals $604_{0-7}$, each coupled to a corresponding one of decoding lines $504(b_{0-7})$. Some of input terminals 604 are inverting inputs (represented by a circle at the connection to AND gates 602) and other input terminals are non-inverting inputs (represented by straight lines into AND gates 602).

Each combination of inverting and non-inverting inputs defines an address for the associated AND gate. For example, when decoding lines $504(b_{0-7})$ all assert a logical low signal on respective inputs $604_{0-7}$ of AND gate $602_0$, the inverting inputs convert the logical lows to logical highs, so that very input to AND gate $602_0$ is a logical high. Responsive to every input being high, AND gate $602_0$ asserts a voltage on output terminal $606_0$, which closes a switch $608_0$. When closed, switch $608_0$ couples a high voltage source $610_0$ to an intermediate terminal $612_0$. An enable switch $614_0$ selectively couples intermediate terminal $612_0$ to readout line $116_0$ responsive to an overwrite enable signal on enable line 128. When an overwrite enable signal is asserted on enable line 128, enable switches $614_{0-M}$ all close, and because switch $608_0$ is also closed, the predetermined value of high voltage source $610_0$ is asserted on readout line $116_0$. To summarize, when an enable signal is asserted on enable line 128 and a select signal is asserted on row select line $300_0$ (FIG. 3), readout line $116_0$ is electrically coupled to high voltage source $610_0$, thereby overwriting the corresponding pixel value of the associated row of image data with a predetermined pixel value corresponding to the voltage of high voltage source $610_0$. The predetermined pixel value ($V_{hi}$) is outside of the normal range of values that could be captured by photosensitive pixels 200, which makes the predetermined value easy to detect in the captured image data.

AND block $600_{24}$ is substantially similar to AND block $600_0$, except that input terminals $604_{24}$ are arranged in a different combination of inverting and non-inverting inputs. The particular arrangement of inverting and non-inverting inputs corresponds to an address associated with AND block $600_{24}$. Particularly, the input terminals $604_{24}$ that are coupled to decoding lines 504 ($b_3$ and $b_4$) are non-inverting, and the remaining input terminals $604_{24}$ are inverting. As a result, a signal 00011000 on decoding lines 504 is converted to 11111111 at the input of AND gate $602_{24}$. Similarly, in AND block $600_{25}$, the input terminals $604_{25}$ that are coupled to decoding lines 504 ($b_0$, $b_3$ and $b_4$) are non-inverting, and the remaining input terminals $604_{24}$ are inverting. Thus, a signal 00011001 on decoding lines 504 is converted to the signal 11111111 at the input of AND gate $602_{25}$. In general, AND block $600_j$ includes a combination of inverting and non-inverting inputs $604_j$, which will convert an address (j) asserted on decoding lines $504(b_{0-7})$ to an input of 11111111 at the input of AND gate $602_j$. As a result, there is a predefined relationship between each row 202 and the particular location within the row (e.g., which column 204) of the pixel value that gets overwritten.

In this example embodiment, the relationship between rows 202 and columns 204 is such that, when a select signal is asserted on row select line $300_i$, readout line $116_j$, where j=i, is coupled to high voltage source $610_j$. The pattern asserted in the image data by global AND block 212 is dependent on this relationship, which in this particular example results in a diagonal line of predetermined pixel values, corresponding to $V_{hi}$, being imposed on an image captured from pixel array 104.

In alternate embodiments, the pattern can be any of a wide range of patterns that allow image processor 110 to determine which of rows 202 corresponds to a row of image data in a captured image, based on the location of the predetermined pixel value in that row of image data. In other alternate embodiments, the pattern can include a repeating pattern, for example two diagonal lines stacked on top of each other. In such an embodiment, the rows of image data would be processed sequentially, one row at a time, and the image processor can determine, based on the position of the predetermined pixel value in each row of image data relative to the position of the predetermined pixel value in the previous row of image data, that the rows had been sequenced properly, within a degree of certainty, based on the number of pattern repetitions. For example, if the alternate pixel array contains 24 rows and patterns two stacked diagonal lines, each covering 12 rows and a repeated 12 columns, the probability that two rows are readout in the wrong sequence while having the proper patterning, is $\frac{1}{24}$. As more identical patterns are added, the probability of an undetected failure increases. Generally, the probability is modeled by the equation: $P=n-1/i$, where P is the probability of an undetected failure, n is the number of identical patterns, and i is the number of rows of the pixel array. Embodiments of this type can be useful for situations where tradeoffs between wiring complexity and reliability can be made. For example, if a pixel array uses a repeated pattern, each repetition covering 32 rows, the error detection circuitry would only require five encoding and decoding lines (and associated elements, such as gate transistors per row) each and only 32 AND gates.

Figure 7:
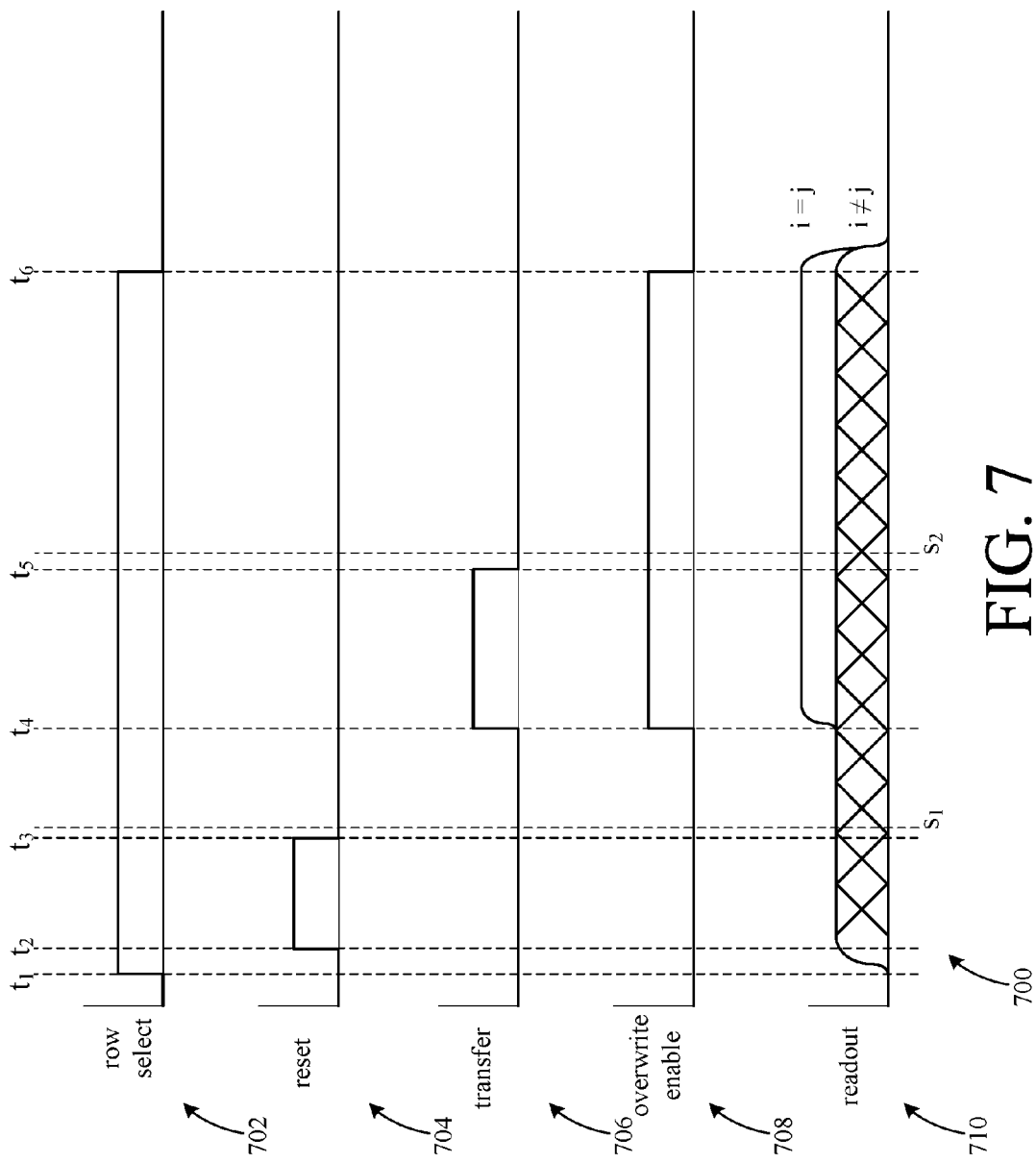
FIG. 7 is a timing diagram showing the sequencing of control and readout signals asserted on various components of the image capture device of FIG. 2.

FIG. 7 is a timing diagram 700 illustrating the sequencing of various signals used for coordinating the readout operation of a row of pixels of image sensor 100. The particular structure of the pixel cell is not an essential element of this invention. For example, the invention can be implemented with different types of pixel architectures including, but not limited to, known 3T and 4T active sensor pixels. In addition, the present invention can be implemented in devices using a rolling shutter, a global shutter, or any other type of shutter scheme. As another option, pixel sensors can be signal sampled or multi-sampled (e.g., correlated double sampling).

In this example embodiment, a rolling shutter is used. The integration period (the time during which charge is accumulated in the sensor proportional to the amount of incident light) is initiated at some predetermined time prior to the readout operation of FIG. 7. For example, the integration period can be initiated by an initiate pointer moving a programmable number of rows ahead of the row being readout.

In addition to FIG. 7, the following description also references FIGS. 2-6, for clarity. A row select signal 702 illustrates the signal asserted on row select line $300_0$. A reset signal 704 illustrates the signal asserted on reset line $302_0$. A transfer signal 706 illustrates the signal asserted on transfer line $304_0$. An enable signal 708 illustrates the signal asserted on enable line 128. A readout signal 710 illustrates the signal received from, photosensitive pixel $200_{0,j}$ on readout line $116_j$. Taken together, diagrams 702, 704, 706,

708, and 710 comprise timing diagram 700 and illustrate the sequencing of various functions of image sensor 100.

Row select signal 702, reset signal 704, transfer signal 706, and readout signal 710, together, illustrate the sequencing of reading image data from photosensitive pixels $200_{0,j}$. First, at a first time $t_1$, a high signal is asserted on row select line $300_0$, placing gate transistors $306_{0,j}$ in a conductive state and electrically coupling pixels $200_{0,j}$ to readout lines $116_{0,j}$, which at time $t_1$ are in an unknown state. This unknown state is represented in timing diagram 700 by a plurality X's within a range of possible pixel values. Then, at a second time, $t_2$, a high reset signal is asserted on reset line $302_0$, resetting the floating diffusion region of photosensitive pixels $200_{0,j}$ to a known state. At a third time, $t_3$, the high reset signal on reset line $302_0$ goes low. Then, at a first sample time $S_1$, the pixel reset voltage is captured by row sampling circuit 108.

At time $t_4$, a high signal is asserted on transfer line $304_0$, causing charge to transfer from the photodiodes to the floating diffusion regions of photosensitive pixels $200_{0,j}$. Then, at time $t_5$, the transfer signal goes low, isolating the floating diffusion region from the photodiode. Then, at a second sample time $S_2$, pixels $200_{0,j}$ assert a voltage, proportional to the charge on the floating diffusion region and within the range of possible voltages, on readout lines $116_j$. This is the voltage that is read from photosensitive pixels $200_{0,j}$ and converted into image data, by subtracting this voltage from the pixel reset voltage (correlated double sampling). At time $t_6$, the high enable signal is removed from row select line $300_0$.

Pattern generator 124 overwrites the output of a selected one of pixels $200_{0,j}$ responsive to the enable signal 708 being asserted on line 128 by control circuit 112. At time $t_1$, when the high signal is asserted on row select line $300_0$, the high signal is detected by OR block $206_0$ (FIG. 4). OR block $206_0$ encodes the detected high signal onto encoding lines 404 as a 11111111 bitwise signal and communicates the signal to NOT block 208 (FIG. 5). NOT block 208 inverts the bitwise signal into a 00000000 bitwise signal and asserts the inverted signal on decoding lines 504, which communicate the inverted signal to global AND block 212, where it is decoded. In this cycle, the inverted signal corresponds to AND gate $214_0$ and causes AND block $602_0$ (FIG. 6) to output a voltage on terminal $606_0$, which closes switch $608_0$. At time $t_4$, a high signal is asserted on enable line 128, which closes switches $614_j$ (including switch $614_0$), thereby electrically coupling high voltage source $610_0$ to readout line $116_0$. The predetermined voltage $V_{hi}$ is then asserted on readout line $116_0$ and overwrites the pixel value of pixel $200_{0,j}$. The predetermined value $V_{hi}$ is higher than any of the possible voltages produced by photosensitive pixels $200_{0,j}$ and is read out by row sampling circuit 108 as part of the captured image. When Vhi is subtracted from the previously captured reset voltage, the result is a very negative value, making it easy to distinguish between the inserted pattern and a regular (or even defective) pixel value. At time $t_6$ the high signals are removed from row select line $300_0$ and enable line 128, electrically isolating readout lines $116_j$ from photosensitive pixels $200_{0,j}$, and readout line $116_0$ from high voltage source $610_0$.

In the example embodiment, the voltage established on readout line $116_j$ at time $t_4$ is overwritten by voltage source $610_j$, only when i=j. In alternate embodiments, the relationship between row number and column number can be represented by any of a multitude of functions.

Figure 8:
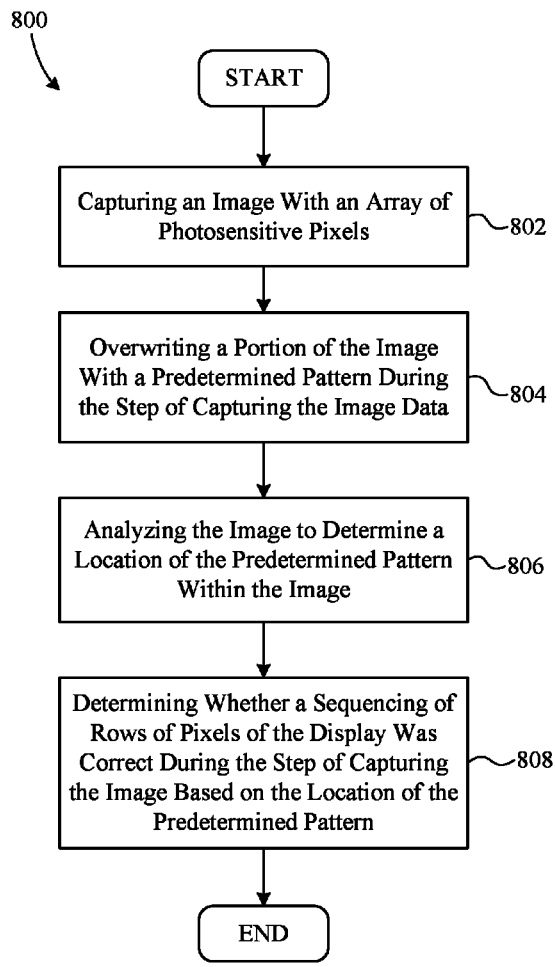
FIG. 8 is a flow chart summarizing an example method of detecting readout timing failures according to the present invention.

FIG. 8 is a flowchart summarizing an example method 800 of verifying proper row sequencing in an image capture device. In a first step 802, an image is captured with an array of photosensitive pixels. In a second step 804, a portion of the image is overwritten with a predetermined pattern during image capture. Next, in a third step, 806 the image is analyzed to determine a location of the predetermined pattern within the image. Then, in a fourth step 808, it is determined whether the sequencing of rows of pixels of the display was correct during image capture, based on the location of the predetermined pattern.

Figure 9:
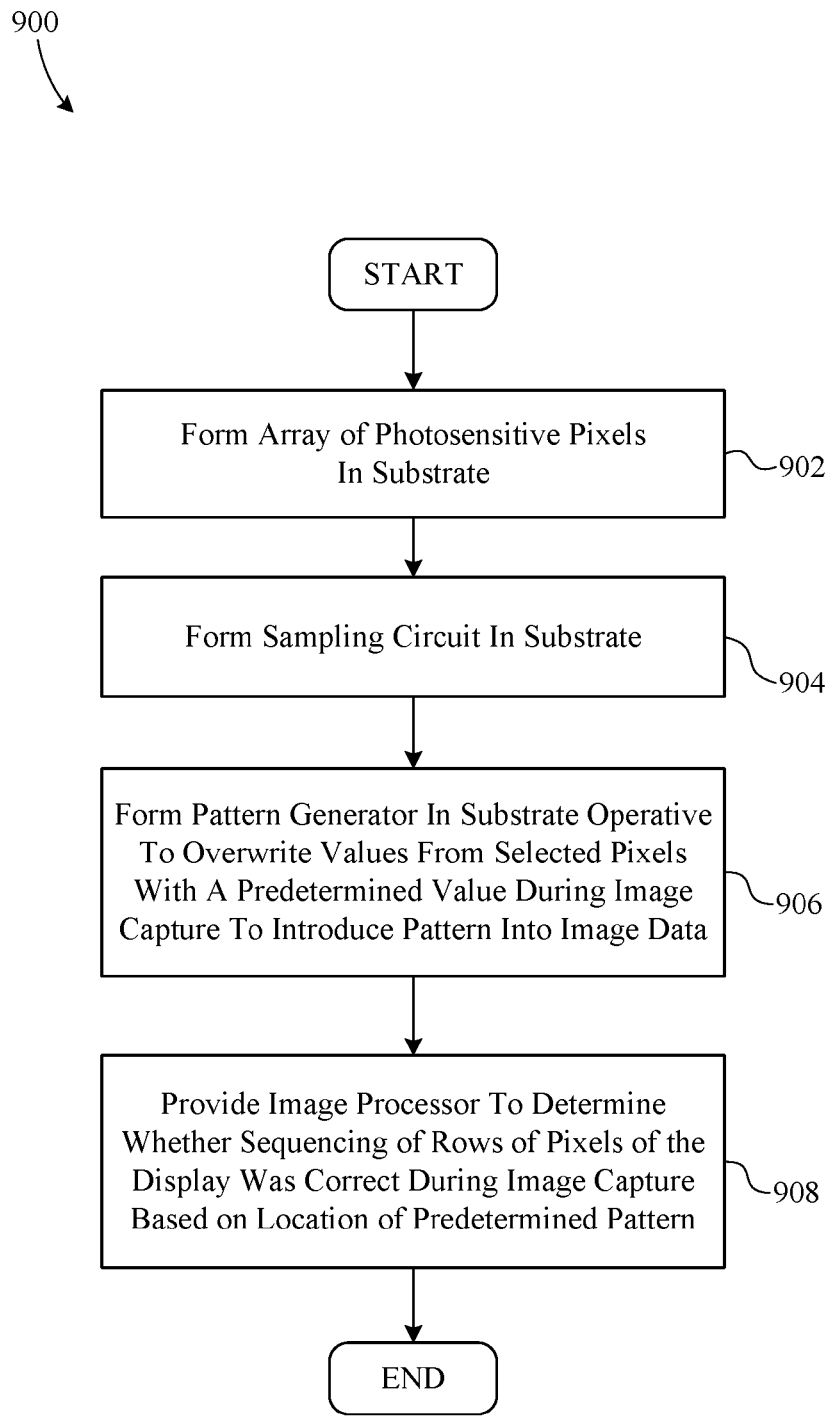
FIG. 9 is a flowchart summarizing an example method of manufacturing an image capture device.

FIG. 9 is a flowchart summarizing an example method 900 of manufacturing an image capture device. In a first step 902, an array of photosensitive pixels is formed in a substrate. Then, in a second step 904, a sampling circuit is formed in the substrate. Next, in a third step 906, a pattern generator is formed in the substrate, the pattern generator being operative to overwrite values from selected pixels with a predetermined value during image capture to introduce a pattern into the image data. Then, in a fourth step 908, an image processor is provided, the image processor being operative to determine whether sequencing of rows of the photosensitive pixels was correct during image capture based on a location of the predetermined pattern.

The description of particular embodiments of the present invention is now complete. Many of the described features may be substituted, altered or omitted without departing from the scope of the invention. For example, the decoding and encoding elements (e.g., row detector 122 and pattern generator 124) of the present invention are described as hardware elements. In alternate embodiments, these elements can be replaced by some combination of hardware, firmware, and/or software. As another example, many of the described elements can be functionally combined. For example, control circuit 112 can include the functionality of image processor 110. These and other deviations from the particular embodiments shown will be apparent to those skilled in the art, particularly in view of the foregoing disclosure.

I claim:
1. An image capture device configured to detect sequencing errors, comprising:
    an array of photosensitive pixels operative to capture pixel values corresponding to an image incident thereon;
    a sampling circuit operative to receive said pixel values from said array of photosensitive pixels and to store said pixel values as image data;
    a pattern generator operative to overwrite a group of said pixel values with a predetermined value, while said pixel values are being received from said photosensitive pixels by said sampling circuit, to introduce a predetermined pattern into said image data;
    an image processor electrically coupled to receive said image data and configured to analyze said image data to determine a location of said predetermined pattern within said image data and determine whether a sequencing of rows of pixels of said display was correct while said image data was captured based on said location of said predetermined pattern.

2. The image capture device of claim 1, wherein:
    said sampling circuit is operative to read a row of pixel values from each of said rows of pixels during an associated predetermined time period and to convert said rows of pixel values into rows of said image data corresponding to each of said rows of pixels;

said pattern generator is operative to overwrite one of said pixel values in each of said rows of pixel values with a predetermined value during said predetermined time period; and said image processor is configured to determine whether said sequencing of said rows of pixels of said display was correct based at least in part on a position of said predetermined values in each of said rows of image data.

3. The image capture device of claim 2, further comprising:

an encoder coupled to receive signals indicative of a selected row of said pixel array and operative to provide an encoded value to said pattern generator indicative of said selected row; and wherein said pattern generator decodes said encoded value, determines a particular pixel location within said selected row depending on said encoded value, and overwrites said pixel value corresponding to said determined location with said predetermined pixel value.

4. The image capture device of claim 3, further comprising:

a plurality of row select lines, each of said row select lines being electrically coupled to communicate a row select signal to each of said photosensitive pixels in an associated one of said rows of photosensitive pixels; and wherein said encoder is coupled to said plurality of row select lines and configured to generate said encoded values based at least in part on which of said row select lines is communicating said row select signal.

5. The image capture device of claim 4, wherein:

said sampling circuit includes a plurality of readout lines, each of said plurality of readout lines being coupled to each photosensitive pixel in a column of pixels and configured to transfer said pixel values from said photosensitive pixels in said column to said sampling circuit; and said pattern generator is coupled to said plurality of readout lines and configured to decode said encoded values and assert a predetermined voltage corresponding to said predetermined value on one of said readout lines based on each said encoded value.

6. The image capture device of claim 2, wherein which pixel values of each particular row that are overwritten depends on a location of each particular row in said array.

7. The image capture device of claim 2, wherein said image processor is further operative to remove said predetermined pattern from said image data after determining said location of said predetermined pattern within said image data.

8. The image capture device of claim 1, wherein:

said photosensitive pixels of said array are arranged in columns and rows; and for each row (r), a pixel value in column (c=r) is overwritten with said predetermined value, where (r) is a variable representing row position and (c) is a variable representing column position in said array.

9. The image capture device of claim 1, wherein:

said pixel values have a range; and said predetermined value is outside of said range of said pixel values.

10. The image capture device of claim 1, wherein said predetermined pattern is a diagonal line in an image represented by said image data.

11. A method for detecting sequencing errors in an image capture device, said method comprising:

capturing pixel values corresponding to an image with an array of photosensitive pixels;

storing said pixel values as image data;

overwriting a group of said pixel values with a predetermined value during said step of capturing said pixel values to introduce a predetermined pattern into said image data;

analyzing said image to determine a location of said predetermined pattern within said image data; and determining whether a sequencing of rows of pixels of said display was correct during said step of capturing said pixel values, based on said location of said predetermined pattern.

12. The method of claim 11, wherein:

said step of capturing pixel values corresponding to an image with an array of photosensitive pixels includes reading a row of pixel values from each of said rows of pixels during an associated predetermined time period;

said step of storing said pixel values as image data includes converting said rows of pixel values into rows of said image data corresponding to each of said rows of pixels;

said step of overwriting a group of said pixel values with a predetermined value includes overwriting one of said pixel values in each of said rows of pixel values with a predetermined value during said predetermined time period; and said step of determining whether a sequencing of rows of pixels of said display was correct during said step of capturing said pixel values includes determining whether said sequencing of said rows of pixels of said display was correct based at least in part on a position of one of said predetermined values in each of said rows of image data.

13. The method of claim 12, wherein said step of overwriting one of said pixel values in each of said rows of pixel values with a predetermined value during said predetermined time period includes:

detecting a signal indicative of a selected row of said pixel array;

providing an encoded value indicative of said selected row;

decoding said encoded value to determine a particular pixel location within said selected row depending on said encoded value; and overwriting said pixel value corresponding to said determined pixel location with said predetermined value.

14. The method of claim 13, wherein:

said step of reading a row of pixel values from each of said rows of photosensitive pixels includes electrically coupling a row select line to each of said rows of pixels and communicating a row select signal to each of said photosensitive pixels in an associated one of said rows of photosensitive pixels; and said step of providing an encoded value indicative of said selected row includes generating said encoded value based at least in part on which of said row select lines is communicating said row select signal.

15. The method of claim 14, wherein overwriting one of said pixel values in each of said rows of pixel values with a predetermined value during said predetermined time period includes:

electrically coupling a plurality of readout lines to said photosensitive pixels, each readout line of said plurality of readout lines being coupled to each photosensitive pixel in an associated column of pixels;

transferring said pixel values from said photosensitive pixels of each said column via said associated readout lines; and asserting a predetermined voltage corresponding to said predetermined value on a different one of said readout lines based on each said encoded value.

16. The method of claim 11, wherein:

said photosensitive pixels of said array are arranged in columns and rows; and overwriting a group of said pixel values with a predetermined value during said step of capturing said pixel values includes, for each row (r), overwriting a pixel value in column (c=r) with said predetermined pixel value, where (r) is a variable representing row position and (c) is a variable representing column position in said array.

17. The method of claim 11, wherein:

said step of capturing pixel values corresponding to an image with an array of photosensitive pixels includes capturing pixel values within a range; and said step of overwriting a group of said pixel values with a predetermined value during said step of capturing said pixel values includes overwriting a group of said pixel values with a value that is outside of said range of said pixel values.

18. The method of claim 12, wherein which pixel values of each particular row that are overwritten depends on a location of each particular row in said array.

19. The method of claim 18, wherein said step of overwriting a group of said pixel values with a predetermined value during said step of capturing said pixel values to introduce a predetermined pattern into said image data includes overwriting a group of said pixel values to create a diagonal line in an image represented by said image data.

20. The method of claim 11, further comprising removing said predetermined pattern from said image data after determining said location of said predetermined pattern within said image data.

21. A method of manufacturing an image capture device capable of detecting sequencing errors, said method comprising:

forming an array of photosensitive pixels in a substrate, said array of photosensitive pixels operative to capture pixel values corresponding to an image incident thereon;

forming a sampling circuit in said substrate, said sampling circuit operative to receive said pixel values from said array of photosensitive pixels and to store said pixel values as image data;

forming a pattern generator in said substrate, said pattern generator operative to overwrite a group of said pixel values with a predetermined value, while said pixel values are being received from said photosensitive pixels by said sampling circuit, to introduce a predetermined pattern into said image data;

providing an image processor electrically coupled to receive said image data and configured to analyze said image data to determine a location of said predetermined pattern within said image data and determine whether a sequencing of rows of pixels of said display was correct while said image data was captured based on said location of said predetermined pattern.

* * * * *